(12) United States Patent
Barber

(10) Patent No.: US 7,665,359 B2
(45) Date of Patent: Feb. 23, 2010

(54) CLEAR HANGING MEASURING CUP

(75) Inventor: Thomas Barber, Rancho Cucamonga, CA (US)

(73) Assignee: Bradshaw International, Inc., Rancho Cucamonga, CA (US)

( * ) Notice: Subject to any disclaimer, the term of this patent is extended or adjusted under 35 U.S.C. 154(b) by 100 days.

(21) Appl. No.: 12/110,887

(22) Filed: Apr. 28, 2008

(65) Prior Publication Data

US 2009/0044622 A1 Feb. 19, 2009

Related U.S. Application Data

(63) Continuation of application No. 29/287,491, filed on Aug. 15, 2007, now Pat. No. Des. 580,798.

(51) Int. Cl.
*G01F 19/00* (2006.01)
(52) U.S. Cl. ....................................................... 73/426
(58) Field of Classification Search ........... 73/426–429; D10/46.2–46.3
See application file for complete search history.

(56) References Cited

U.S. PATENT DOCUMENTS

| D268,158 S | 3/1983 | Doyel |
| D473,148 S | 4/2003 | Kleckauskas et al. |
| 6,769,302 B1 | 8/2004 | King et al. |
| D532,321 S * | 11/2006 | Heiligenstein et al. .... D10/46.2 |

* cited by examiner

*Primary Examiner*—Hezron Williams
*Assistant Examiner*—Nathaniel Kolb
(74) *Attorney, Agent, or Firm*—Birch, Stewart, Kolasch & Birch, LLP

(57) ABSTRACT

A pouring vessel is provided that includes a body having a bottom, a sidewall extending from the bottom, and an opening substantially opposite the bottom, the opening being defined by the sidewall. The pouring vessel also includes a handle connected to the body adjacent the opening. The handle includes a free end distal from the body and a through hole located adjacent the sidewall for receiving an elongated member while hanging from a display.

16 Claims, 4 Drawing Sheets

CLEAR HANGING MEASURING CUP

CROSS-REFERENCE TO RELATED APPLICATIONS

This application is a continuation of prior application Ser. No. 29/287,491, filed Aug. 15, 2007 now U.S. Pat. No. D580,798, and is herein incorporated by reference.

BACKGROUND OF THE INVENTION

1. Field of the Invention

The present invention relates generally to pouring vessels, and more particularly, to pouring vessels that include handles from which the pouring vessels can be hung for storage and display.

2. Description of Related Art

Conventional pouring vessels, which may include ice/water pitchers, creamers, gravy separators, and dry/liquid measuring cups, typically are formed as a single body having a handle that extends from one side surface or a top edge of the pouring vessel. The handle may include a free end or be formed so that the handle is joined to a side surface of the pouring vessel. If the handle is of the latter configuration, the conventional pouring vessel is not easily stackable to minimize storage space or easily displayed by the handle to provide efficient use of the display space. If the handle is of the former configuration the handle may or may not include a through hole at the free end for hanging. However, in such a configuration, the pouring vessels are free to pivot about the through hole, making it much harder to arrange on a display.

BRIEF SUMMARY OF THE INVENTION

According to principles of this invention, a pouring vessel is provided that allows the pouring vessel to hang at a specific angle, which allows multiple pouring vessels to be nested while on display. In addition, the arrangement of the handle and the body of the pouring vessel allows the pouring vessel to center itself while being supported on a rod or other member of a display.

In order to achieve one or more of the above aspects, a pouring vessel is provided that includes a body having a bottom, a sidewall extending from the bottom, and an opening substantially opposite the bottom, the opening being defined by the sidewall. The pouring vessel also includes a handle connected to the body adjacent the opening. The handle includes a free end distal from the body and a through hole located adjacent the sidewall for receiving an elongated member while hanging from a display.

In another aspect, the handle may include a first portion adjacent the sidewall, the first portion extending away from the bottom of the body. The handle may include a second portion extending from the first portion opposite the sidewall, the second portion extending away from the sidewall, and extending towards the bottom of the body.

In a different aspect, an outer surface of the handle may be concave and the inner surface of the handle may be convex, such that when two or more pouring vessels are nested, the inner surface of the handle of one of the pouring vessels is partially received by the outer surface of the handle of an adjacent pouring vessel.

In still another aspect, a first portion of the through hole may be defined by the sidewall. A second portion of the through hole opposite the sidewall may have a substantially semi-circular shape.

In a further aspect, a point on the second portion of the through hole furthest from the sidewall may be in the center of the substantially semi-circular shape, such that, when the pouring vessel is supported on an elongated member of a display, the pouring vessel is supported at said point and is substantially centered about said point.

In another aspect, the opening may include a pouring lip opposite the handle.

In yet another aspect, the opening of the body may be larger than the bottom of the body.

In another aspect, the pouring vessel may be a measuring cup.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
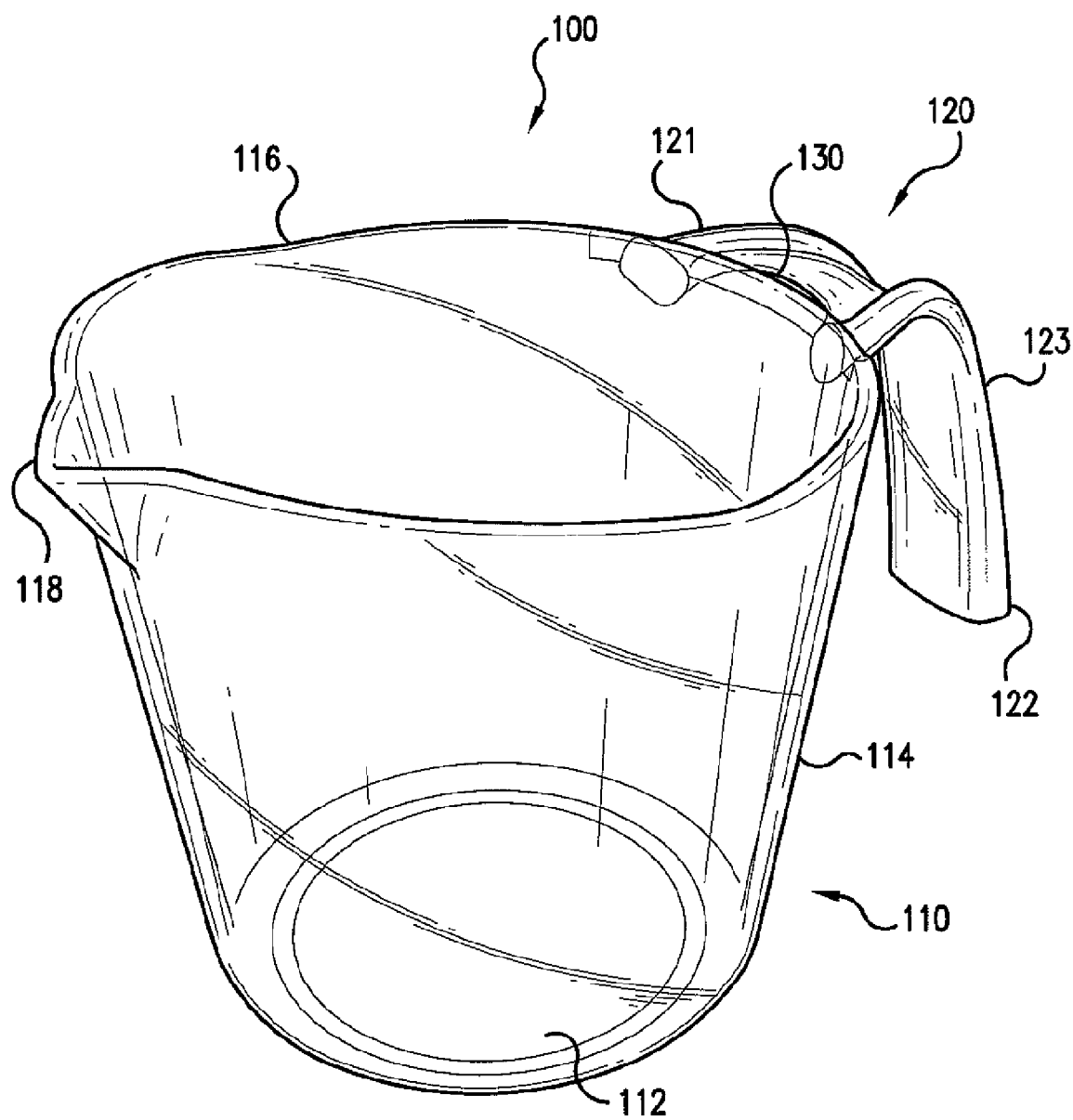
FIG. 1 shows a perspective view of a pouring vessel according to an exemplary embodiment of the present invention.

According to an exemplary embodiment of the present invention a pouring vessel is described with reference to the following figures. While the figures show a pouring vessel in the form of a dry/liquid measuring cup, it is understood that the present invention is applicable to other pouring vessels including, but not limited to, ice/water pitchers, creamers, and gravy separators.

As shown in FIGS. 1-4, the pouring vessel 100 includes a body 110, a handle 120 attached to the body 110, and a through hole 130 formed in the handle 120 adjacent the body 110. In particular, the body 110 includes a bottom 112, a sidewall 114 that extends upward from the bottom 112, and an opening 114 defined by the sidewall 114. Indicia may be located on the sidewall 114 to correspond to specific fluid measurements, such as, for example, 1 cup, 2 cups, 3 cups, and corresponding intervals therebetween. In addition, similar indicia related to metric measurements may also be provided in addition to or in place of the conventional U.S. measurements.

For situations where the fluid held in the pouring vessel 100 is hot, the bottom 112 may include a support base 113 (see FIG. 2) to minimize contact between the bottom and any surface that the pouring vessel 100 is placed on. The support base 113 also increases the rigidity of the bottom 112. While the support base 113 is shown as circular, it is understood that any other support base may be provided including multiple extruding portions.

Figure 2:
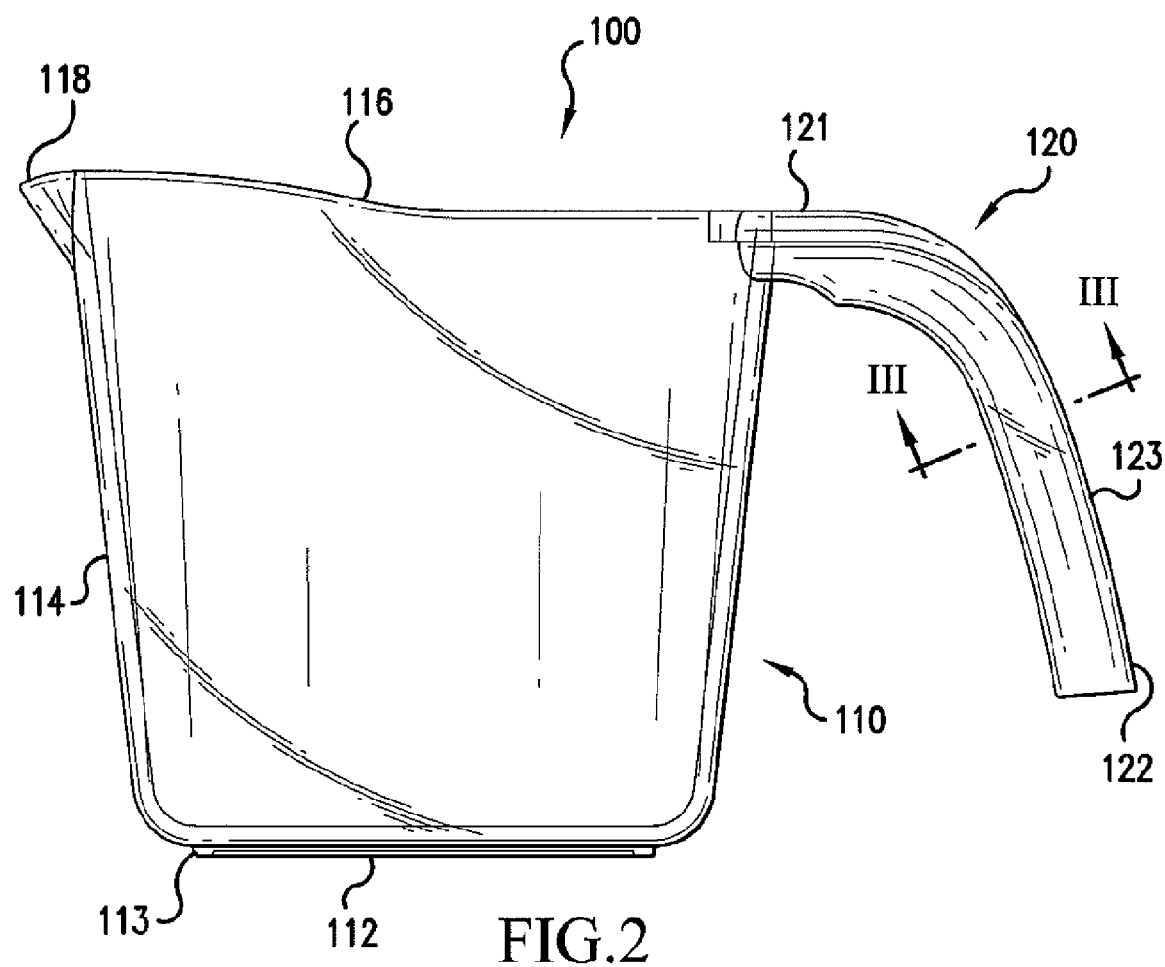
FIG. 2 shows an elevation view of the pouring vessel of FIG. 1.
Figure 3:
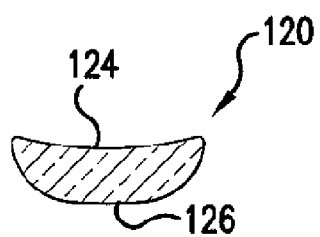
FIG. 3 shows a cross-sectional view of the handle taken along line III-III of FIG. 2.

As shown in FIGS. 1-3, the bottom 112 is smaller in diameter than the opening to allow the pouring vessel 100 to be nested with similar pouring vessels, either for storage or for display purposes. In addition, the sidewall 114 may be arranged so that a portion of the sidewall adjacent the handle is closer to perpendicular with respect to the bottom 112 than a portion of the sidewall furthest from the handle 120. By providing this configuration of the sidewall, the handle 120 can be aligned with the handle 120 of a nested pouring vessel. In addition, a pouring lip 118 is formed in the opening 116 at the portion of the sidewall furthest from the handle 120. In this manner, the center of gravity of the pouring vessel 100 can be moved closer to the opening, which will assist in displaying the pouring vessel 100.

The handle 120 includes a free end 122 distal form the body 110 and an end opposite the free end that is joined to body 110 at the opening 116. While the pouring vessel 100 shows the handle 120 as being integral with the body 110, it is understood that the handle 120 could be affixed to the body 110 using conventional techniques. In addition, it is understood that as long as the handle 120 includes a free end 122, the handle could be located anywhere on the sidewall 114 near the opening 116.

The handle 120 includes a first portion 121 adjacent the sidewall 114 and extending at an angle away from the bottom 112. While the first portion 121 shown in FIGS. 1, 2, and 5 extends upward at slight angle with respect to the opening 116, it is understood that more extreme angles could be provided if desired. In addition, placement of the handle 120 can be controlled so that the handle 120 does not extend past the opening 116. The handle 120 also includes a second portion 123 that extends away from the opening 116 towards the bottom 112. In this manner, two or more pouring vessels can be nested for storage or display while minimizing the amount of space taken up by the pouring vessels.

As shown in FIG. 3, the handle 120 has an outer surface 124 that has a concave shape and an inner surface 126 that has a convex shape. The contours for the outer surface 124 and the inner surface 126 assist in the nesting and aligning of the pouring vessels when two or more pouring vessels are stored or displayed.

Figure 4:
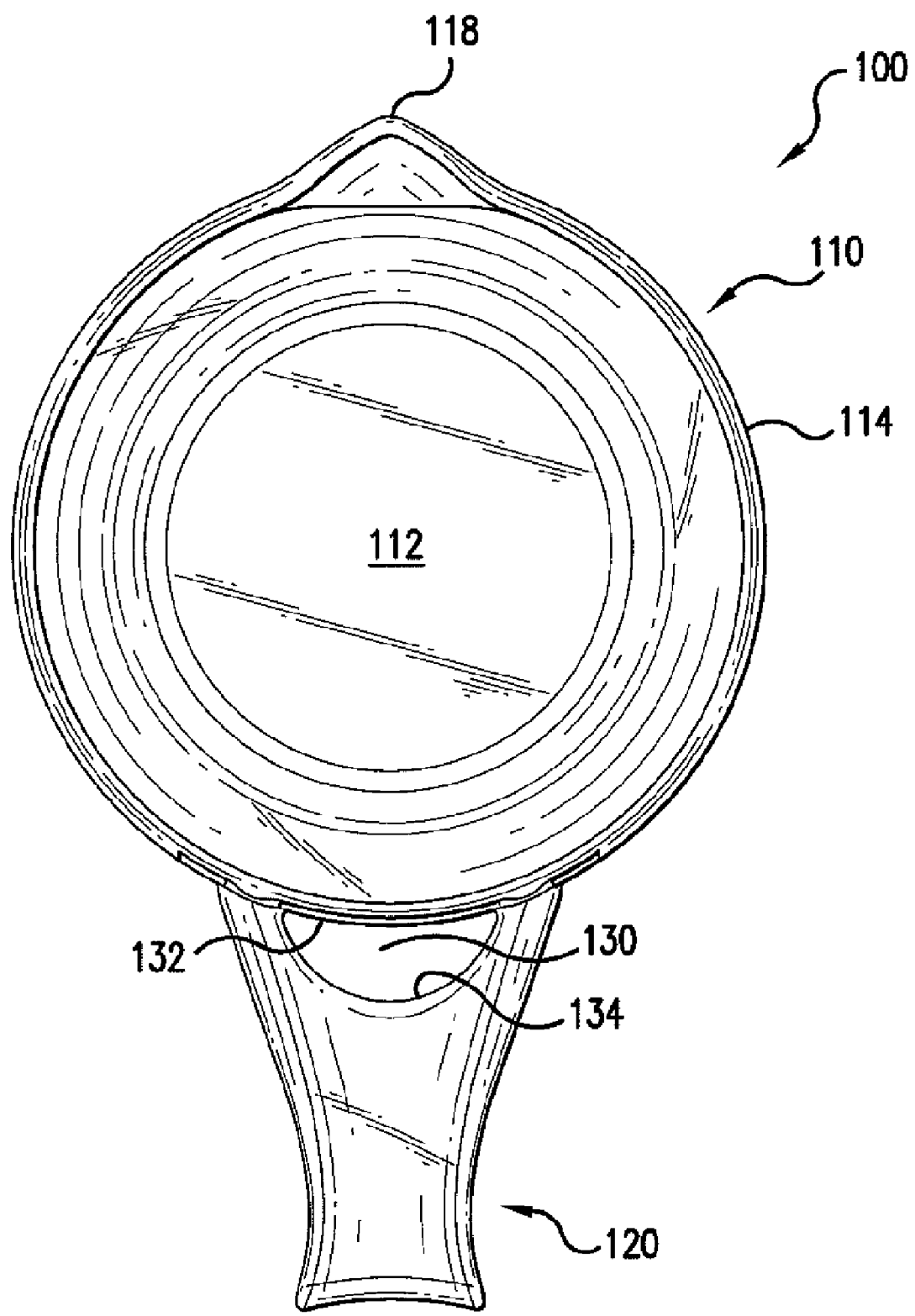
FIG. 4 shows a plan view of the pouring vessel of FIG. 1.

As best seen in FIG. 4, the through hole 130 of the handle 120 is located adjacent the sidewall 114 such that the sidewall 114 defines a first portion 132 of through hole 130. A second portion 134 of the through hole 130 opposite the sidewall 114 has a substantially semi-circular shape. While the exemplary embodiment shows a substantially semi-circular shape, other shapes, including a substantially parabolic arch, are possible so long as the through hole 130 is configured to be supportable by a elongated member 140 (see FIG. 5) extending through the through hole 130 and contacting the second portion 134 of the through hole 130.

The pouring vessel 100 may be made of many different materials, such as plastic, glass, or ceramic. In addition, the pouring vessel 100 may be transparent, semi-transparent, or opaque, depending on the intended use of the pouring vessel. For example, when the pouring vessel 100 is a measuring cup, it is desirable for the body 110 to be transparent or semi-transparent to more easily identify the quantity of liquid or dry material in the pouring vessel 100. When the pouring vessel 100 is not primarily used for measuring, more opaque materials may be used depending on the aesthetic needs of the pouring vessel.

As described above, the pouring vessel 100 could be in the form of an ice/water pitcher, a gravy separator, or a creamer, in addition to the described measuring cup. If the pouring vessel is a gravy separator, it is preferable to provide the separating tube inside the pouring vessel.

Figure 5:
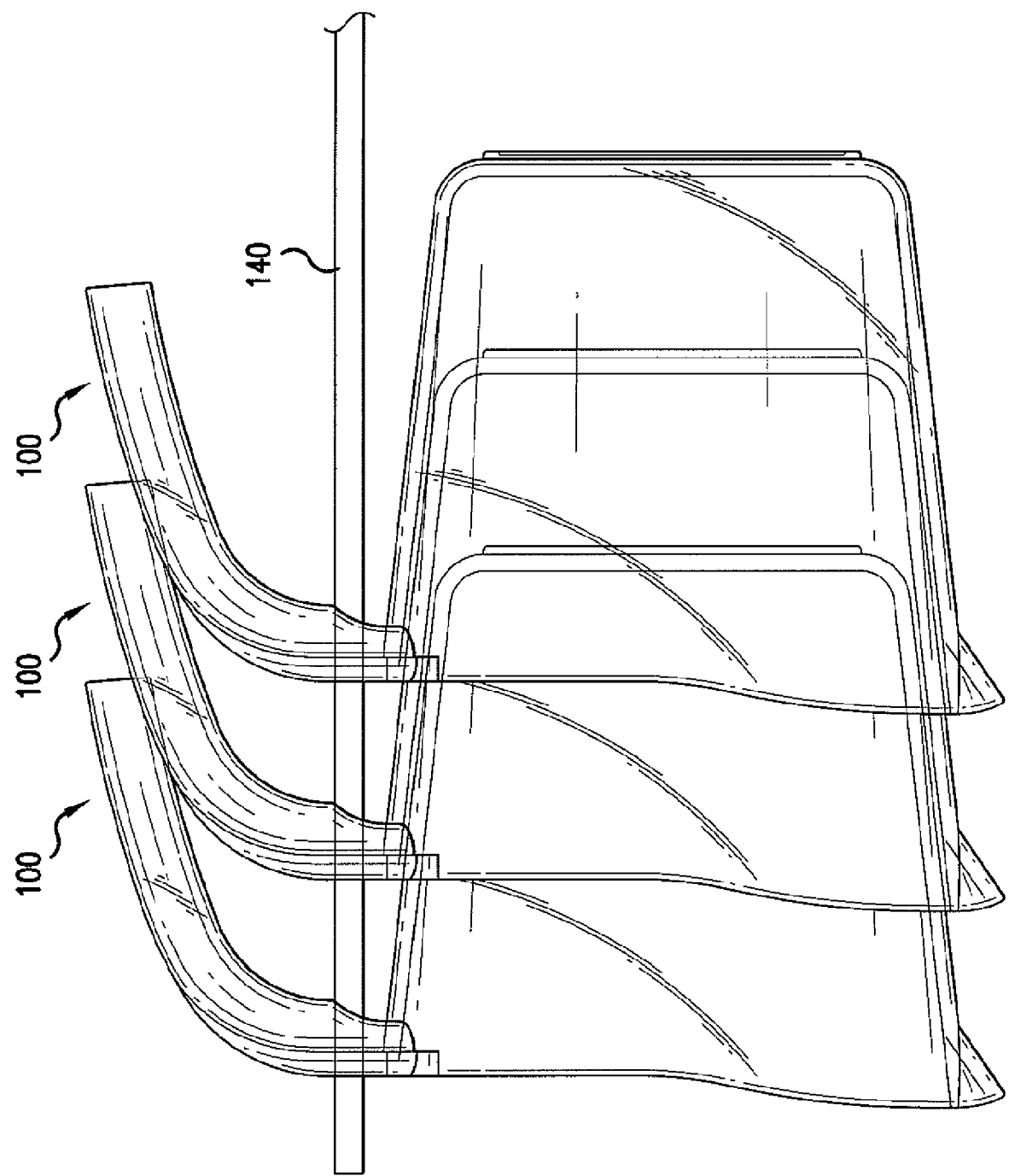
FIG. 5 shows a plurality of pouring vessels according to the present invention hanging on a elongated member of a display.

Having described the various features of the pouring vessel 100, the nesting and self-aligning capabilities will be described with reference to FIG. 5. As shown in FIG. 5, multiple pouring vessels 100 are supported on the elongated member 140, such as a display hook, of a display (not shown). Many of the described features of the pouring vessel, taken individually or in combination, contribute to the ease of nesting of the pouring vessels for display purposes.

For example, as shown in FIG. 5, each of the pouring vessels 100 is supported by the second portion 134 of the through hole 130 contacting the elongated member 140. By selecting the proper contour of the second portion 134, the pouring vessel 100 can be self-aligning on the elongated member 140. In particular, if the second portion 134 has a substantially semi-circular shape and the center of the substantially semi-circular shape is aligned in the same plane as the center of gravity of the pouring vessel 100, the pouring vessel 100 will freely hang to evenly distribute the weight of the pouring vessel 100 so that additional pouring vessels can be supported by the elongated member 140 thereby minimizing the amount of space occupied by the pouring vessels.

In addition to the through hole 130 provided in the handle 120, the contours and general shape of the handle 120 also assists in the nesting of multiple pouring vessels. For example, by providing the first and second portions 121, 123 of the handle extending in the configuration as described above, the handles 120 can overlap each other so as to provide a more compact nesting configuration. In addition, the arrangement of the handle 120 moves the center of gravity closer to the through hole 130, which also helps in aligning the pouring vessels 100 when supported by the elongated member 140.

Furthermore, because the handle 120 includes the outer surface 124 having a concave shape and the inner surface 126 having a convex shape, contact of the inner surface 126 of one handle with the outer surface 124 of an adjacent handle assists in guiding the pouring vessels into a nesting alignment. In this manner, the handle 120 provides a further mechanism for correcting the alignment of multiple pouring vessels as they are placed on the elongated member 140 for display.

Finally, the overall shape of the body 110 also assists in the nesting alignment of the pouring vessels. For example, because the sidewall 114 is arranged so that a portion of the sidewall 114 adjacent the handle is closer to perpendicular with respect to the bottom 112 than a portion of the sidewall furthest from the handle 120, the opening 116 freely receives the bottom 112 of an adjacent pouring vessel as the pouring vessels are placed on the elongated member. Furthermore, by providing the pouring lip 118 opposite the handle, in addition to the arrangement of the sidewall 114, it is possible to shift the center of gravity closer to the opening so that the center of gravity is more closely located under the opening 130.

As a result, the present invention provides a pouring vessel 100 that is easily placed on a display such that the pouring vessels are self-aligning. In addition, the pouring vessels 100 are easily nested thereby minimizing space occupied by the pouring vessels.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A pouring vessel comprising:
   a body having a bottom, a sidewall extending from the bottom, and an opening substantially opposite the bottom, the opening being defined by the sidewall; and
   a handle connected to the body adjacent the opening, the handle having a free end distal from the body, and a through hole located adjacent the sidewall for receiving an elongated member while hanging from a display wherein
      a first portion of the through hole is defined by the sidewall, and
      a second portion of the through hole opposite the sidewall is defined by the handle and has a substantially semi-circular shape.

2. The pouring vessel of claim 1, wherein the handle includes a first portion adjacent the sidewall, the first portion extending away from the bottom of the body.

3. The pouring vessel of claim 2, wherein the handle includes a second portion extending from the first portion opposite the sidewall, the second portion extending away from the sidewall, and extending towards the bottom of the body.

4. The pouring vessel of claim 1, wherein an outer surface of the handle is concave and the inner surface of the handle is convex, such that when two or more pouring vessels are nested, the inner surface of the handle of one of the pouring vessels is partially received by the outer surface of the handle of an adjacent pouring vessel.

5. The pouring vessel of claim 1, wherein a point on the second portion of the through hole furthest from the sidewall is in the center of the substantially semi-circular shape, such that, when the pouring vessel is supported on an elongated member of a display, the pouring vessel is supported at said point and is substantially centered about said point.

6. The pouring vessel of claim 1, wherein the opening includes a pouring lip opposite the handle.

7. The pouring vessel of claim 1, wherein the opening of the body is larger than the bottom of the body.

8. The pouring vessel of claim 1, wherein the pouring vessel is a measuring cup.

9. A plurality of nested pouring vessels comprising:
   at least two pouring vessels, each pouring vessel having:
      a body having a bottom, a sidewall extending from the bottom, and an opening substantially opposite the bottom, the opening defined by the sidewall; and
      a handle connected to the body adjacent the opening, the handle having a free end distal from the body, and a through hole located adjacent the sidewall for receiving an elongated member while hanging from a display wherein
         a first portion of the through hole is defined by the sidewall, and
         a second portion of the through hole opposite the sidewall is defined by the handle and has a substantially semi-circular shape,
   and wherein, when the at least two pouring vessels are supported by an elongated member of a display, the through holes are substantially aligned when nested.

10. The plurality of nesting pouring vessels according to claim 9, wherein each handle includes a first portion adjacent the sidewall, the first portion extending away from the bottom of the body.

11. The plurality of nested pouring vessels of claim 9, wherein each handle includes an outer surface having a concave shape and an inner surface having a convex shape, such that when the at least two pouring vessels are nested, the inner surface of the handle of one of the three pouring vessels is partially received by the outer surface of the handle of an adjacent pouring vessel.

12. The plurality of nested pouring vessels of claim 9, wherein a point on each of the second portions of each through hole furthest from the sidewall is in the center of the substantially semi-circular shape, such that, when the at least two pouring vessels are supported on an elongated member of a display, each pouring vessels is supported at said point and is substantially centered about said point.

13. The plurality of nested pouring vessels of claim 9, wherein each of said openings includes a pouring lip opposite the handle.

14. The plurality of nested pouring vessels of claim 9, wherein each of said openings is larger than the bottom of the body.

15. The plurality of nested pouring vessels of claim 9, wherein each of the pouring vessels is a measuring cup.

16. The plurality of nested pouring vessels of claim 9, wherein the at least two pouring vessels includes three pouring vessels, such that, when the three pouring vessels are supported by an elongated member of a display, the center of the through holes defines a straight line.

* * * * *